(12) United States Patent
Kim

(10) Patent No.: US 9,029,011 B2
(45) Date of Patent: May 12, 2015

(54) SECONDARY BATTERY AND BATTERY PACK INCLUDING SECONDARY BATTERY

(75) Inventor: Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 14 days.

(21) Appl. No.: 13/364,237

(22) Filed: Feb. 1, 2012

(65) Prior Publication Data

US 2012/0225333 A1    Sep. 6, 2012

(30) Foreign Application Priority Data

Mar. 2, 2011    (KR) .................. 10-2011-0018438

(51) Int. Cl.
| H01M 2/30 | (2006.01) |
| H01M 2/20 | (2006.01) |
| H01M 2/02 | (2006.01) |
| H01M 2/32 | (2006.01) |
| H01M 2/34 | (2006.01) |

(Continued)

(52) U.S. Cl.
CPC .............. *H01M 2/204* (2013.01); *H01M 2/021* (2013.01); *H01M 2/206* (2013.01); *H01M 2/30* (2013.01); *H01M 2/32* (2013.01); *H01M 2/34* (2013.01); *H01M 2200/103* (2013.01); *Y02T 10/7011* (2013.01); *H01M 10/0413* (2013.01); *H01M 10/0431* (2013.01); *H01M 10/058* (2013.01)

(58) Field of Classification Search
USPC ............................................ 429/61, 178, 179
See application file for complete search history.

(56) References Cited

U.S. PATENT DOCUMENTS 4,879,187 A * 11/1989 Biegger ............................ 429/7
5,348,815 A    9/1994 Barker
5,644,282 A *  7/1997 Mehta et al. .................. 337/295

(Continued)

FOREIGN PATENT DOCUMENTS

CA    1263696 A1 * 12/1989
EP   1 096 589 A1    5/2001

(Continued)

OTHER PUBLICATIONS

Korean Patent Abstract No. 10-2003-0066963 A, dated Aug. 14, 2003, corresponding with KR 10-0440937 B1 (2 pages).

(Continued)

*Primary Examiner* — Stewart Fraser
*Assistant Examiner* — Olatunji Godo
(74) *Attorney, Agent, or Firm* — Christie, Parker & Hale, LLP

(57) ABSTRACT

A secondary battery and a battery pack including the second battery, which includes a battery case having a polarity (e.g., positive or negative polarity) in a normal operation, thereby reducing corrosion of the battery case and facilitating a design of an external circuit. The battery case is neutralized in an abnormal operation (e.g., penetration of a nail, over discharge, and over charge), thereby improving safety and reliability of the secondary battery and the battery pack. The secondary battery includes an electrode assembly, a battery case accommodating the electrode assembly, electrode terminals electrically connected to the electrode assembly and extending out of the battery case, and a fuse part disposed between the battery case and the electrode terminal to electrically connect the battery case to the electrode terminal. The fuse part is configured to selectively electrically disconnect the battery case from the electrode terminal.

16 Claims, 6 Drawing Sheets

(51) Int. Cl.
*H01M 10/04* (2006.01)
*H01M 10/058* (2010.01)

(56) References Cited

U.S. PATENT DOCUMENTS

| | | | |
|---|---|---|---|
| 6,111,387 A * | 8/2000 | Kouzu et al. | 320/107 |
| 2003/0180582 A1 | 9/2003 | Masumoto | |
| 2004/0018417 A1 | 1/2004 | Stack | |
| 2005/0238930 A1 | 10/2005 | Yoshida et al. | |
| 2006/0051664 A1 | 3/2006 | Tasai et al. | |
| 2007/0202364 A1 * | 8/2007 | Uh et al. | 429/7 |
| 2009/0087693 A1 | 4/2009 | Kim et al. | |
| 2009/0274956 A1 * | 11/2009 | Kosugi et al. | 429/158 |
| 2009/0297944 A1 * | 12/2009 | Oh et al. | 429/179 |
| 2010/0116570 A1 * | 5/2010 | Sugawara et al. | 180/65.1 |
| 2010/0216009 A1 | 8/2010 | Kim | |
| 2010/0227212 A1 | 9/2010 | Kim | |
| 2010/0291421 A1 | 11/2010 | Byun et al. | |
| 2011/0244317 A1 | 10/2011 | Lee et al. | |
| 2012/0148910 A1 | 6/2012 | Kambayashi et al. | |
| 2013/0089760 A1 * | 4/2013 | Kim et al. | 429/61 |

FOREIGN PATENT DOCUMENTS

| | | |
|---|---|---|
| EP | 1 422 771 A1 | 5/2004 |
| EP | 2 360 754 A2 | 8/2011 |
| JP | 08-315802 | 11/1996 |
| JP | 09-153352 | 6/1997 |
| JP | 2000-182598 A | 6/2000 |
| JP | 2003-346779 | 12/2003 |
| JP | 2004-199991 | 7/2004 |
| JP | 2006-156064 A | 6/2006 |
| JP | 2008-159351 | 7/2008 |
| JP | 2008-186591 | 8/2008 |
| JP | 2011-165611 | 8/2011 |
| KR | 10-0440937 B1 | 7/2004 |
| KR | 10-0855583 B1 | 9/2008 |
| KR | 10-2009-0106547 A | 10/2009 |
| KR | 10-2010-0096755 A | 9/2010 |
| KR | 10-2010-0099596 A | 9/2010 |
| KR | 10-2010-0123598 A | 11/2010 |
| WO | WO 2012/048652 A1 | 4/2012 |

OTHER PUBLICATIONS

KR Notice of Allowance dated Feb. 13, 2013 for KR Application No. 10-2011-0018438 (5 pages).
European Search Report dated Jun. 15, 2012 for Application No. 12157451.1, 8 pages.
English Machine Translation of JP Publication No. 2003-346779, 7 pages.
English Machine Translation of JP Publication No. 2008-186591, 14 pages.
KIPO Notice of Allowance dated Aug. 1, 2012 in corresponding application 10-2011-0018438 (4 pages).
EPO Search Report dated Sep. 28, 2012, for European Patent application 12178554.7, (7 pages).
U.S. Office action dated Jul. 11, 2013, for cross reference U.S. Appl. No. 13/484,667, (17 pages).
U.S. Office action dated Nov. 8, 2013, for cross reference U.S. Appl. No. 13/484,667, (11 pages).
Patent Abstracts of Japan, and English machine translation of Japanese Publication 08-315802 dated Nov. 29, 1996, listed above, (6 pages).
Patent Abstracts of Japan, and English machine translation of Japanese Publication 09-153352 dated Oct. 6, 1997, listed above, (10 pages).
Patent Abstracts of Japan, and English machine translation of Japanese Publication 2004-199991 dated Jul. 15, 2004, listed above, (18 pages).
Patent Abstracts of Japan, and English machine translation of Japanese Publication 2008-159351 dated Jul. 10, 2008, listed above, (8 pages).
Patent Abstracts of Japan, and English machine translation of Japanese Publication 2011-165611 dated Aug. 25, 2011, listed above, (14 pages).
Patent Abstracts of Japan, and English machine translation of Japanese Publication 2009-289602 dated Dec. 10, 2009, (25 pages).

* cited by examiner

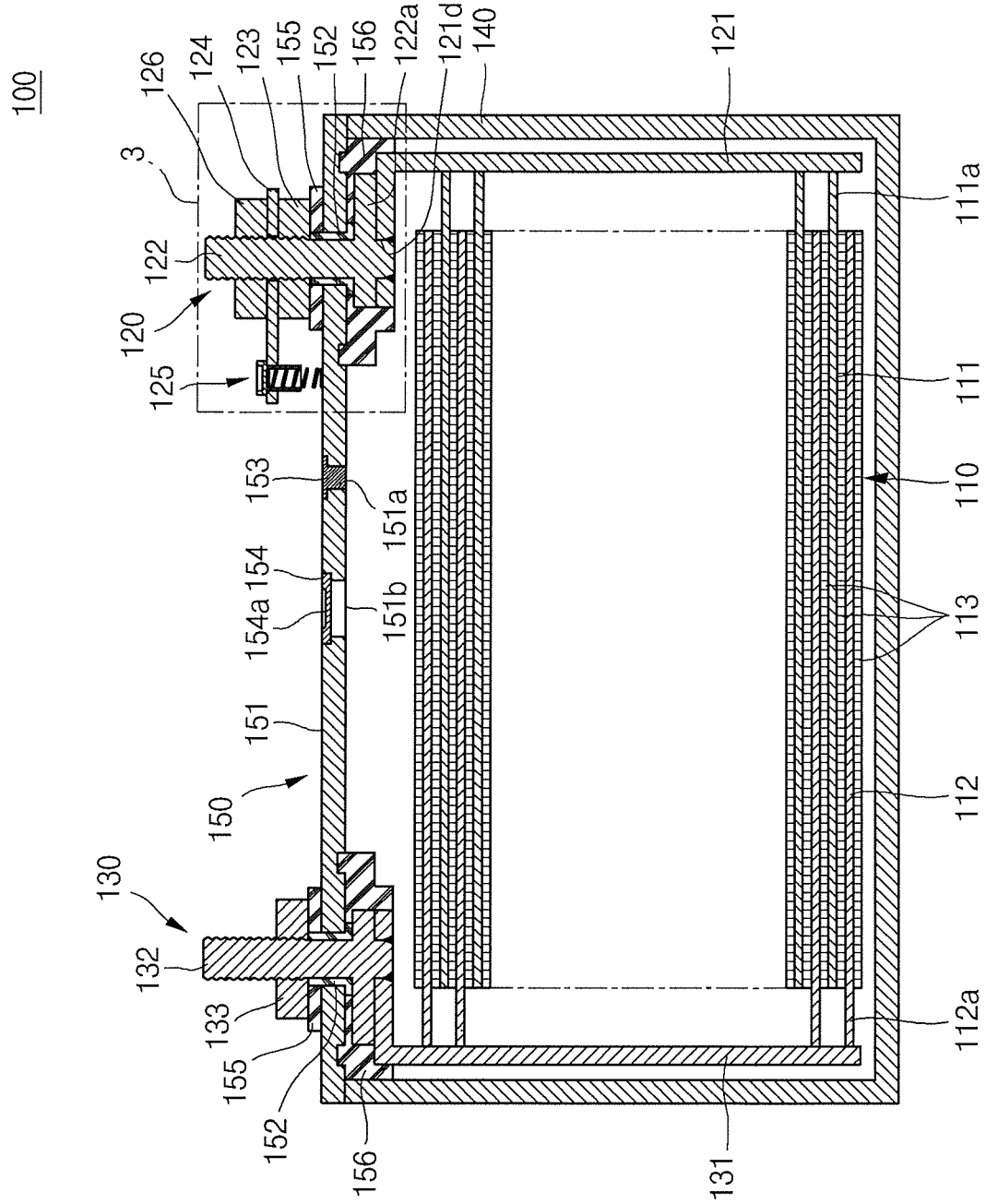

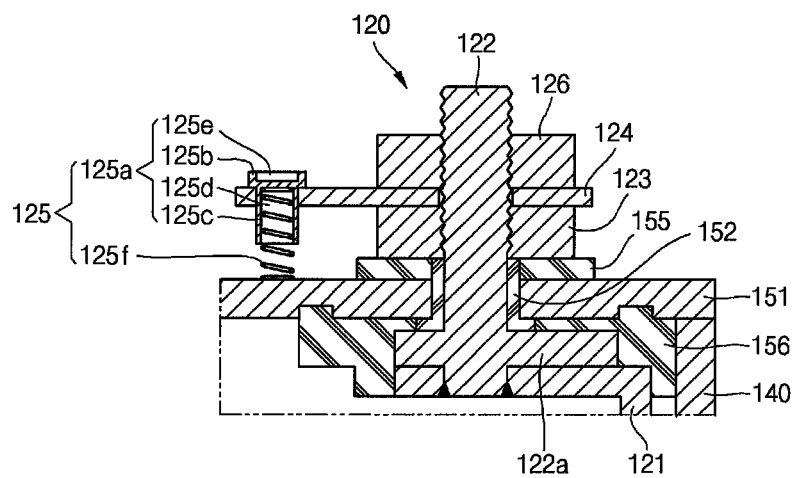
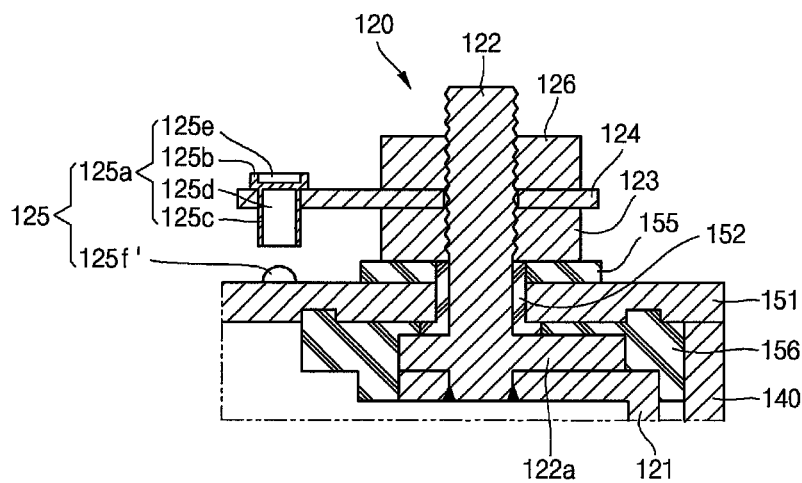

SECONDARY BATTERY AND BATTERY PACK INCLUDING SECONDARY BATTERY

CROSS-REFERENCE TO RELATED APPLICATION

This application claims priority to and the benefit of Korean Patent Application No. 10-2011-0018438, entitled "SECONDARY BATTERY AND BATTERY PACK INCLUDING SECONDARY BATTERY," filed on Mar. 2, 2011 in the Korean Intellectual Property Office, the entire content of which is herein incorporated by reference.

BACKGROUND

1. Field

Aspects of embodiments according to the present invention relate to a secondary battery and a battery pack including the secondary battery.

2. Description of the Related Art

Unlike primary batteries, secondary batteries are rechargeable. Of these secondary batteries, a low capacity battery including a battery cell in the form of a pack may be used in small portable electronic devices such as cellular phones and camcorders, while a high capacity battery including tens of battery cells connected to one another may be used as a power source for driving a motor, e.g., for electric scooters, hybrid vehicles, or electric vehicles.

Secondary batteries are manufactured in various shapes such as a cylindrical shape and a prismatic shape. An example secondary battery may be constructed as follows. Electrolyte and an electrode assembly formed by interposing a separator as an insulator between a positive electrode plate and a negative electrode plate are accommodated in a battery case. Then, a cap plate is installed on the battery case. The electrode assembly is connected with a positive terminal and a negative terminal, which protrude through the cap plate and are exposed to the outside of the electrode assembly.

SUMMARY

Aspects of embodiments according to the present invention are directed toward a secondary battery, and a battery pack including the second battery, which includes a battery case having a polarity (e.g., a positive or negative polarity) in a normal operation, thereby preventing or reducing corrosion of the battery case and facilitating a design of an external circuit.

In addition, aspects of embodiments according to the present invention are directed toward a secondary battery, and a battery pack including the second battery, which includes a battery case that is neutralized in an abnormal operation (e.g., penetration of a nail, over discharge, and over charge), thereby improving safety and reliability of the second battery and the battery pack.

In an exemplary embodiment according to the present invention, a secondary battery is provided. The secondary battery includes an electrode assembly, a battery case accommodating the electrode assembly, an electrode terminal electrically connected to the electrode assembly and extending out of the battery case, and a fuse part for electrically connecting the battery case to the electrode terminal. The fuse part is configured to selectively electrically disconnect the battery case from the electrode terminal.

The battery case may include a cap plate covering the electrode assembly. The battery case may be electrically connected to the cap plate. The electrode terminal may pass through the cap plate and extend out of the cap plate.

The electrode terminal may include a first coupling member for mechanically coupling the electrode terminal to the cap plate while being electrically insulated from the cap plate, a connecting bar for electrically connecting to the electrode terminal, and a second coupling member for mechanically coupling the electrode terminal to the connecting bar.

The battery case may be electrically insulated from the electrode assembly within the battery case.

The electrode terminal may include a positive electrode terminal and a negative electrode terminal. The fuse part may be for electrically connecting the battery case to the positive electrode terminal.

The secondary battery may further include a connecting bar for electrically connecting the fuse part to the electrode terminal.

The fuse part may include a fuse holder for coupling to the connecting bar and a fuse device for coupling to the fuse holder to electrically connect the battery case to the connecting bar. The fuse device may be configured to selectively electrically disconnect the battery case from the connecting bar.

The fuse holder may include a first region on a surface of the connecting bar and a second region passing through the connecting bar and extending from the first region to the battery case and having an accommodation recess to accommodate the fuse device.

The fuse device may include a spring.

The fuse device may be formed of one of an aluminum alloy, a copper alloy, or an alloy of zinc and tin.

The connecting bar may have a first through hole for coupling with the electrode terminal and a second through hole for coupling with the fuse part.

The connecting bar may be formed of one of aluminum or aluminum alloy.

In another exemplary embodiment according to the present invention, a battery pack is provided. The battery pack includes secondary batteries, bus bars, and a fuse part. Each of the secondary batteries includes a battery case and an electrode terminal extending out of the battery case. The electrode terminal is electrically connected to an electrode assembly within the battery case. Each of the bus bars is for electrically connecting to the electrode terminal of one or more of the secondary batteries, to electrically connect the secondary batteries in series or in parallel. The fuse part is for electrically connecting the battery case of one of the secondary batteries to one of the bus bars. The fuse part is configured to selectively electrically disconnect the battery case of the one of the secondary batteries from the one of the bus bars.

The one of the secondary batteries may be an outermost one of the secondary batteries.

The fuse part may include a fuse part for each of both outermost ones of the secondary batteries.

The fuse part may include a fuse part for each of the secondary batteries.

The fuse part may include a fuse holder for coupling to the one of the bus bars and a fuse device for coupling to the fuse holder to electrically connect the battery case of the one of the secondary batteries to the one of the bus bars. The fuse device may be configured to selectively electrically disconnect the battery case of the one of the secondary batteries from the one of the bus bars.

The fuse holder may include a first region on a surface of the one of the bus bars, and a second region passing through the one of the bus bars and extending from the first region to the battery case of the one of the secondary batteries. The second region may have an accommodation recess to accommodate the fuse device.

The fuse device may include a spring.

The one of the bus bars may have a first through hole for coupling with the electrode terminal of the one of the secondary batteries and a second through hole for coupling with the fuse part.

The electrode terminal of the one of the secondary batteries may include a positive electrode terminal and a negative electrode terminal. The one of the bus bars may be electrically connected to the positive electrode terminal.

BRIEF DESCRIPTION OF THE DRAWINGS

The accompanying drawings are included to provide a further understanding of the present invention. The drawings illustrate exemplary embodiments of the present invention and, together with the description, serve to better explain aspects and principles of the present invention. In the drawings:

FIG. 2 is a cross-sectional view taken along line I-I' of FIG. 1A;

FIG. 3 is an enlarged cross-sectional view illustrating a region 3 of the secondary battery of FIG. 2;

FIG. 4 is a cross-sectional view illustrating the secondary battery region of FIG. 3 in a state where a fuse has blown (melted) by an abnormal operation of the secondary battery;

DETAILED DESCRIPTION

Example embodiments will now be described more fully hereinafter with reference to the accompanying drawings. However, the invention may be embodied in different forms and should not be construed as limited to the embodiments set forth herein. The disclosed embodiments are provided to more thoroughly and completely convey the scope of the invention to those of ordinary skill in the art.

Figure 1A:
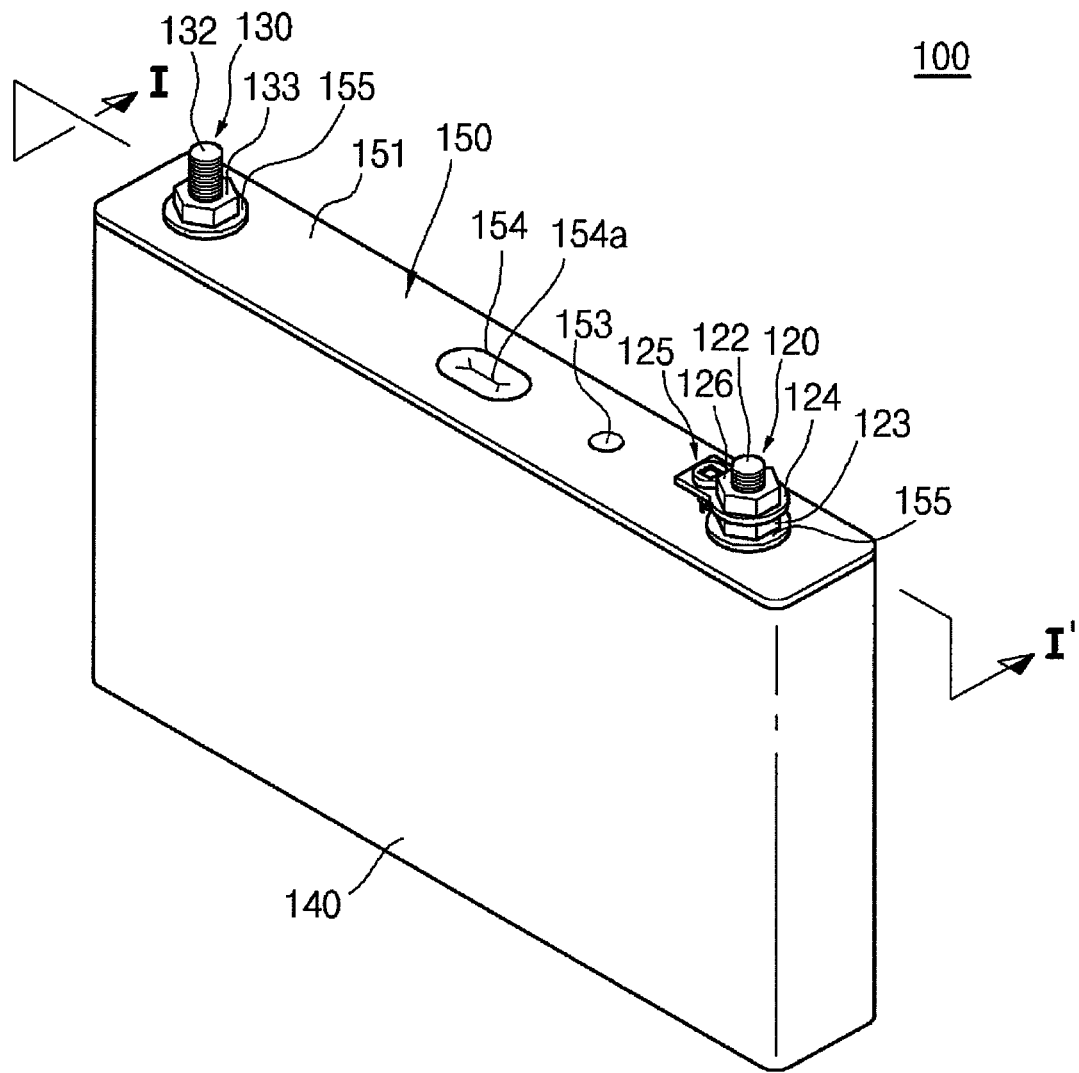
FIGS. 1A and 1B are perspective views illustrating a secondary battery according to an embodiment.
Figure 1B:
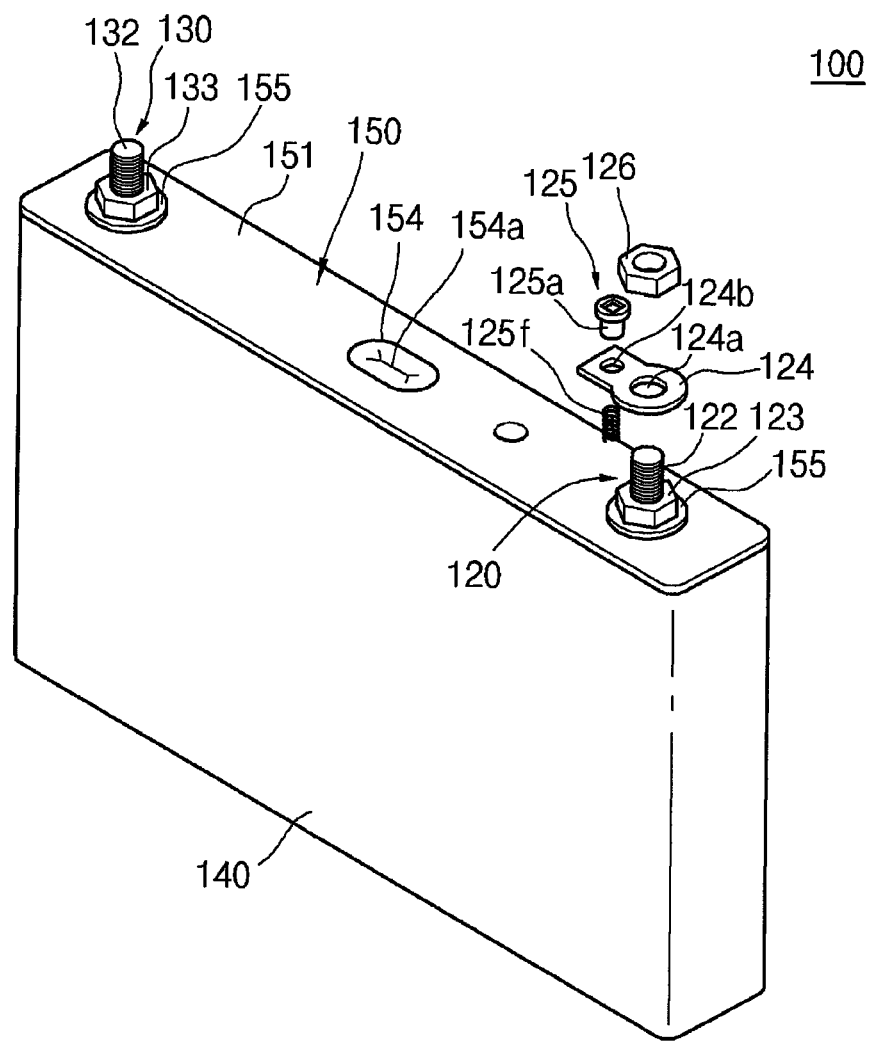

FIGS. 1A and 1B are perspective views illustrating a secondary battery 100 according to an embodiment. FIG. 2 is a cross-sectional view taken along line I-I' of FIG. 1A.

Referring to FIGS. 1A, 1B, and 2, the secondary battery 100 includes an electrode assembly 110, a first electrode terminal 120 (e.g., a positive terminal), a second electrode terminal 130 (e.g., a negative terminal), a battery case 140, and a cap assembly 150. The electrode assembly 110 is formed, for example, by winding or stacking a first electrode plate 111, a separator 113, and a second electrode plate 112, which have, for example, thin plate or film shape. The first electrode plate 111 may function as a positive electrode or a negative electrode, and the second electrode plate 112 has the opposite polarity to that of the first electrode plate 111.

The first electrode plate 111 is formed, for example, by applying a first electrode active material such as a transition metal oxide on a first electrode collector formed, for example, of metal foil such as aluminum foil, and includes a first electrode non-coating portion 111a on which the first electrode active metal is not applied. The first electrode non-coating portion 111a functions as a passage for a current flow between the first electrode plate 111 and the outside of the first electrode plate 111. The material of the first electrode plate 111 is not limited to those discussed above in other embodiments of the present invention.

The second electrode plate 112 is formed, for example, by applying a second electrode active material such as graphite or carbon on a second electrode collector formed, for example, of metal foil such as nickel or copper foil, and includes a second electrode non-coating portion 112a on which the second electrode active metal is not applied. The second electrode non-coating portion 112a functions as a passage for a current flow between the second electrode plate 112 and the outside of the second electrode plate 112. The material of the second electrode plate 112 is not limited to those discussed above in other embodiments of the present invention.

For example, the first electrode plate 111 may have a positive polarity while the second negative plate 112 has a negative polarity. In other embodiments, the polarities of the first and second electrode plates 111 and 112 may be switched.

The separator 113 is disposed between the first electrode plate 111 and the second electrode plate 112 to prevent a short circuit and allow the movement of, for example, lithium ions. The separator 113 may be formed, for example, of polyethylene, polypropylene, or combined film of polypropylene and polyethylene. The material of the separator 113 is not limited to those discussed above in other embodiments of the present invention.

Corresponding ends of the electrode assembly 110 are coupled with the first and second electrode terminals 120 and 130. The first and second electrode terminals 120 and 130 are electrically connected to the first and second electrode plates 111 and 112, respectively.

The electrode assembly 110 and an electrolyte are disposed in the battery case 140. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$ or $LiBF_4$. The electrolyte may be liquid, solid, or gel. The material of the electrolyte is not limited to those discussed above in other embodiments of the present invention.

The first electrode terminal 120 may be formed, for example, of a metal or an equivalent thereof, and is electrically connected to the first electrode plate 111. The first electrode terminal 120 includes a first collecting plate 121, a first collecting terminal 122, a first coupling member 123, a connecting bar 124, a fuse part 125, and a second coupling member 126.

The first collecting plate 121 contacts the first electrode non-coating portion 111a protruding from an end of the electrode assembly 110. The first collecting plate 121 may, for example, be welded to the first electrode non-coating portion 111a. The first collecting plate 121 has an approximately 'L' shape, and a terminal hole 121d is formed in the upper portion thereof. The first collecting terminal 122 is fitted in the terminal hole 121d. The first collecting plate 121 may be formed, for example, of aluminum or aluminum alloy. However, the material of the first collecting plate 121 is not limited thereto.

The first collecting terminal 122 passes through a cap plate 151 to be described later, and protrudes a length (for example, a predetermined length) upward. The first collecting terminal 122 is electrically connected to the first collecting plate 121 at the lower side of the cap plate 151. The first collecting terminal 122 includes a flange 122a at the lower side of the cap plate 151. The flange 122a laterally extends to prevent the removal of the first collecting terminal 122 from the cap plate 151. The lower portion of the first collecting terminal 122 with respect to the flange 122*a* is fitted into the terminal hole 121*d* of the first collecting plate 121 and is riveted or welded thereto.

In addition, the upper portion of the first collecting terminal 122 with respect to the flange 122*a* passes through the cap plate 151, and protrudes, for example, the predetermined length upward. The first coupling member 123 is fixed to the upper portion of the first collecting terminal 122. The upper portion of the first collecting terminal 122 has a thread, so that the first coupling member 123 is screw-coupled thereto.

The first collecting terminal 122 is electrically insulated from the cap plate 151. The first collecting terminal 122 may be formed, for example, of one of aluminum, aluminum alloy, or an equivalent thereof. However, the material of the first collecting terminal 122 is not limited thereto.

The first coupling member 123 has an approximately hexagonal nut shape, and a through hole passes approximately in the vertical direction through the central portion of the first coupling member 123, so that the first collecting terminal 122 can pass through the through hole. The first coupling member 123 may be formed, for example, of one of stainless steel, copper, copper alloy, aluminum, aluminum alloy, or an equivalent thereof, but the present invention is not limited thereto. The first coupling member 123 and the cap plate 151 are electrically insulated from each other.

The connecting bar 124 is provided in the form of an approximately flat plate, and has a first through hole 124*a* coupled with the first collecting terminal 122 and a second through hole 124*b* coupled with the fuse part 125. Thus, the connecting bar 124 is placed on the first coupling member 123 and is electrically connected to the first collecting terminal 122. The connecting bar 124 is also electrically connected to the first coupling member 123. The connecting bar 124 may be formed, for example, of one of stainless steel, copper, copper alloy, aluminum, aluminum alloy, or an equivalent thereof, but the present invention is not limited thereto.

The fuse part 125 is disposed between the connecting bar 124 and the cap plate 151. That is, the fuse part 125 electrically connects the connecting bar 124 to the cap plate 151. In other words, the fuse part 125 connects the first electrode terminal 120 to the battery case 140. Thus, the cap plate 151 and the battery case 140 have the same polarity as that of the first electrode terminal 120. For example, the cap plate 151 and the battery case 140 may have the positive polarity with the fuse part 125. Thus, the cap plate 151 and the battery case 140 may have electric potentials greater than a corrosion potential of about 1 V, thereby preventing or reducing the corrosion of the cap plate 151 and the battery case 140. The configuration of the fuse part 125 will be described later in more detail.

The second coupling member 126 is coupled to the first collecting terminal 122 protruding upward through the connecting bar 124. Thus, the second coupling member 126 stably fixes the connecting bar 124 to the first collecting terminal 122. The second coupling member 126 has an approximately hexagonal nut shape, and a through hole passes approximately in the vertical direction through the central portion of the second coupling member 126, so that the first collecting terminal 122 can pass through the through hole. The second coupling member 126 may be formed, for example, of one of stainless steel, copper, copper alloy, aluminum, aluminum alloy, or an equivalent thereof, but the present invention is not limited thereto.

The second electrode terminal 130 may be formed, for example, of a metal or an equivalent thereof, and is electrically connected to the second electrode plate 112. The second electrode terminal 130 includes a second collecting plate 131, a second collecting terminal 132, and a coupling member 133. The first and second electrode terminals 120 and 130 may have the same shape. Thus, a detailed description of the second electrode terminal 130 will not be repeated. The second collecting plate 131 and the second collecting terminal 132 may be formed, for example, of one of copper, copper alloy, or an equivalent thereof, but the present invention is not limited thereto. The coupling member 133 may be formed, for example, of one of stainless steel, copper, copper alloy, aluminum, aluminum alloy, or an equivalent thereof, but the present invention is not limited thereto.

The battery case 140 is formed, for example, of a conductive metal such as aluminum, aluminum alloy, or steel plated with nickel, and has an approximately hexahedron shape provided with an opening through which the electrode assembly 110, the first electrode terminal 120, and the second electrode terminal 130 are inserted and placed. Although the opening is not shown in FIG. 2, since an assembly of the battery case 140 and the cap assembly 150 is illustrated in FIG. 2, a periphery of the cap assembly 150 substantially forms the opening. The inner surface of the battery case 140 is treated or configured to be electrically insulated from the electrode assembly 110, the first and second electrode terminals 120 and 130, and the cap assembly 150.

The cap assembly 150 is coupled to the battery case 140. In detail, the cap assembly 150 includes the cap plate 151, seal gaskets 152, a plug 153, a safety vent 154, upper insulation members 155, and lower insulation members 156. The seal gaskets 152, the upper insulation members 155, and the lower insulation members 156 may be components of the first and second electrode terminals 120 and 130.

The cap plate 151 closes the opening of the battery case 140, and may have the same material as that of the battery case 140. For example, the cap plate 151 may be coupled to the battery case 140 through laser welding. Since the cap plate 151 may have the same polarity as that of the first electrode terminal 120 as described above, the cap plate 151 and the battery case 140 may have the same polarity. For ease of description, when the cap plate 151 is electrically connected to the battery case 140, the battery case 140 may be described as including the cap plate 151.

The seal gasket 152 is formed of an electrically insulating material and is disposed between the cap plate 151 and each of the first and second collecting terminals 122 and 132 to seal the space between the cap plate 151 and each of the first and second collecting terminals 122 and 132. The seal gasket 152 prevents or reduces the ingress of moisture into the secondary battery 100 or the leakage of the electrolyte from the secondary battery 100.

The plug 153 closes an electrolyte injection hole 151*a* of the cap plate 151. The safety vent 154 is installed in a vent hole 151*b* of the cap plate 151 and may have a notch 154*a* to be opened at a set pressure.

The upper insulation member 155 is disposed between the cap plate 151 and each of the first coupling member 123 and the coupling member 133. The upper insulation member 155 makes close contact with the cap plate 151. Furthermore, the upper insulation member 155 may closely contact the seal gasket 152. The upper insulation member 155 insulates the cap plate 151 and each of the first coupling member 123 and the coupling member 133 from each other.

The lower insulation member 156 is disposed between the cap plate 151 and each of the first and second collecting plates 121 and 131 to prevent or reduce unintended short circuits. That is, the lower insulation member 156 prevents or reduces the likelihood of a short circuit between the cap plate 151 and the first collecting plate 121, and a short circuit between the cap plate 151 and the second collecting plate 131. The lower insulation member 156 is also disposed between the cap plate 151 and each of the first and second collecting terminals 122 and 132 to prevent or reduce unintended short circuits between the cap plate 151 and each of the first and second collecting terminals 122 and 132.

FIG. 3 is an enlarged cross-sectional view illustrating a region 3 of the secondary battery 100 of FIG. 2.

Referring to FIG. 3, the fuse part 125 is disposed between the battery case 140 and the connecting bar 124 to electrically connect or disconnect the battery case 140 from the connecting bar 124. Although it may be more precise to describe the fuse part 125 as disposed between the cap plate 151 and the connecting bar 124, since the cap plate 151 is electrically connected to the battery case 140, the fuse part 125 is considered to be disposed between the battery case 140 and the connecting bar 124 (that is, the cap plate 151 may be thought of as an extension or a part of the battery case 140, as described above). The connecting bar 124 has the first through hole 124a (see FIG. 1B) coupled with the first collecting terminal 122, and the second through hole 124b (see FIG. 1B) coupled with the fuse part 125. The fuse part 125 includes a fuse holder 125a and a fuse device 125f.

The fuse holder 125a is electrically and mechanically coupled to the connecting bar 124 and fixes the fuse device 125f. The fuse holder 125a includes a first region 125b and a second region 125c. The first region 125b is disposed on a surface of the connecting bar 124. The second region 125c passes through the connecting bar 124 and extends a certain length from the first region 125b to the battery case 140. The second region 125c includes an accommodation recess 125d to accommodate the fuse device 125f. The connecting bar 124 has an inner wall defined by the second through hole 124b. The inner wall of the connecting bar 124 may be threaded, and the outer surface of the second region 125c may be threaded, so that the fuse holder 125a can be screw-coupled to the connecting bar 124. A tool hole 125e is disposed in the upper surface of the first region 125b to receive a tool for facilitating the screw-coupling of the fuse holder 125a.

The fuse device 125f is coupled to the fuse holder 125a to connect the battery case 140 and the connecting bar 124 to each other or remove the battery case 140 and the connecting bar 124 from each other. For example, the fuse device 125f may be provided in the form of a spring, but the present invention is not limited thereto. The fuse device 125f may be formed, for example, of one of a copper alloy, an aluminum alloy, an alloy of zinc and tin, or an equivalent thereof such that the fuse device 125f is easily melted down and cut off (that is, blown out) by an over current, but the present invention is not limited thereto. Thus, the fuse device 125f is configured to selectively disconnect the electrical connection it forms between the battery case 140 and the connecting bar 124 in situations such as too much current flowing in or out of the first electrode terminal 120.

As such, the first collecting terminal 122 and the battery case 140 have the same polarity (e.g., positive polarity) before the fuse device 125f is melted. Thus, the battery case 140 has an electric potential greater than a corrosion potential of about 1 V, thereby preventing the corrosion of the battery case 140. In addition, since the battery case 140 has the positive polarity, a circuit design for an external device provided with the secondary battery 100 is relatively straightforward.

FIG. 4 is a cross-sectional view illustrating the secondary battery region of FIG. 3 in a state where a fuse has blown (melted) by an abnormal operation of the secondary battery.

For example, when a nail passes through the secondary battery 100 or when the secondary battery 100 is over discharged or over charged, an over current may flow through the first collecting terminal 122. At this point, the over current also flows through the fuse part 125, which melts the fuse device 125f and causes the fuse part 125 to blow out.

Thus, referring to FIG. 4, an over current melts the fuse device 125f to form a blown fuse device 125f', and the connecting bar 124 and the battery case 140 are electrically disconnected from each other. That is, the charge state of the battery case 140 changes from a positive state to a neutral state. Thus, safety and reliability of the secondary battery 100 are further improved.

Figure 5:
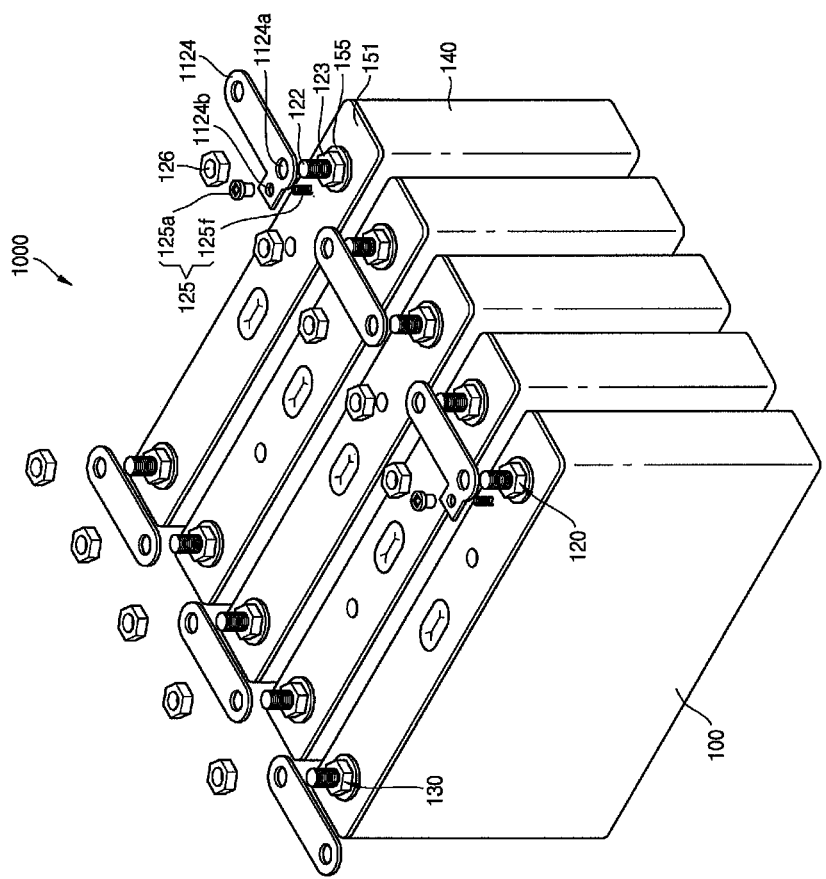
FIG. 5 is an exploded perspective view illustrating a battery pack according to an embodiment.

FIG. 5 is an exploded perspective view illustrating a battery pack 1000 according to an embodiment.

Referring to FIG. 5, the battery pack 1000 includes secondary batteries 100, bus bars 1124, and fuse parts 125. The secondary battery 100 includes electrode terminals that are electrically connected to an electrode assembly disposed in the battery case 140 and extend out of the battery case 140. The electrode terminals may be the first electrode terminal 120 having the positive polarity and the second electrode terminal 130 having the negative polarity.

The bus bar 1124 connects the first electrode terminal 120 of the secondary battery 100 to the second electrode terminal 130 of the adjacent secondary battery 100. In this manner, the secondary batteries 100 may be connected to one another in parallel or in series.

The fuse part 125 is disposed between the bus bar 1124 and the battery case 140 to electrically connect or disconnect the battery case 140 and the first electrode terminal 120. In more detail, the fuse part 125 is disposed between the bus bar 1124 and the cap plate 151, which have the positive polarity. In the secondary battery 100 of FIG. 5, the cap plate 151 is electrically connected to the battery case 140. The fuse part 125 may be provided to an outermost one of the secondary batteries 100, or the fuse parts 125 may be provided to both outermost ones of the secondary batteries 100.

The fuse part 125 includes the fuse holder 125a coupled to the bus bar 1124, and the fuse device 125f coupled to the fuse holder 125a to electrically connect or disconnect the battery case 140 and the bus bar 1124. With reference to FIG. 3, the fuse holder 125a may include the first region 125b that is disposed on a surface of the bus bar 1124, and the second region 125c that includes the accommodation recess 125d passing through the bus bar 1124 and extending from the first region 125b to the battery case 140 and accommodating the fuse device 125f. The fuse device 125f may be provided in the form of a spring, and be formed, for example, of one of a copper alloy, an aluminum alloy, an alloy of zinc and tin, or an equivalent thereof.

The bus bar 1124 includes a first through hole 1124a coupled to the first electrode terminal 120, and a second through hole 1124b coupled to the fuse part 125. The bus bar 1124 may be formed, for example, of one of aluminum, aluminum alloy, or an equivalent thereof.

As such, according to the current embodiment, the first electrode terminal 120 and the battery case 140 have the same polarity before the fuse device 125f is blown, but the battery case 140 is in a neutral state after the fuse device 125f is blown. Thus, when the battery pack 1000 normally operates, the corrosion of the battery case 140 and the cap plate 151 is prevented, and an external circuit is efficiently designed. When, for example, a nail passes through the battery pack 1000 or when the battery pack 1000 is over discharged or over charged, the battery case 140 and the cap plate 151 are quickly neutralized by an over current, thereby improving safety and reliability of the battery pack 1000.

Figure 6:
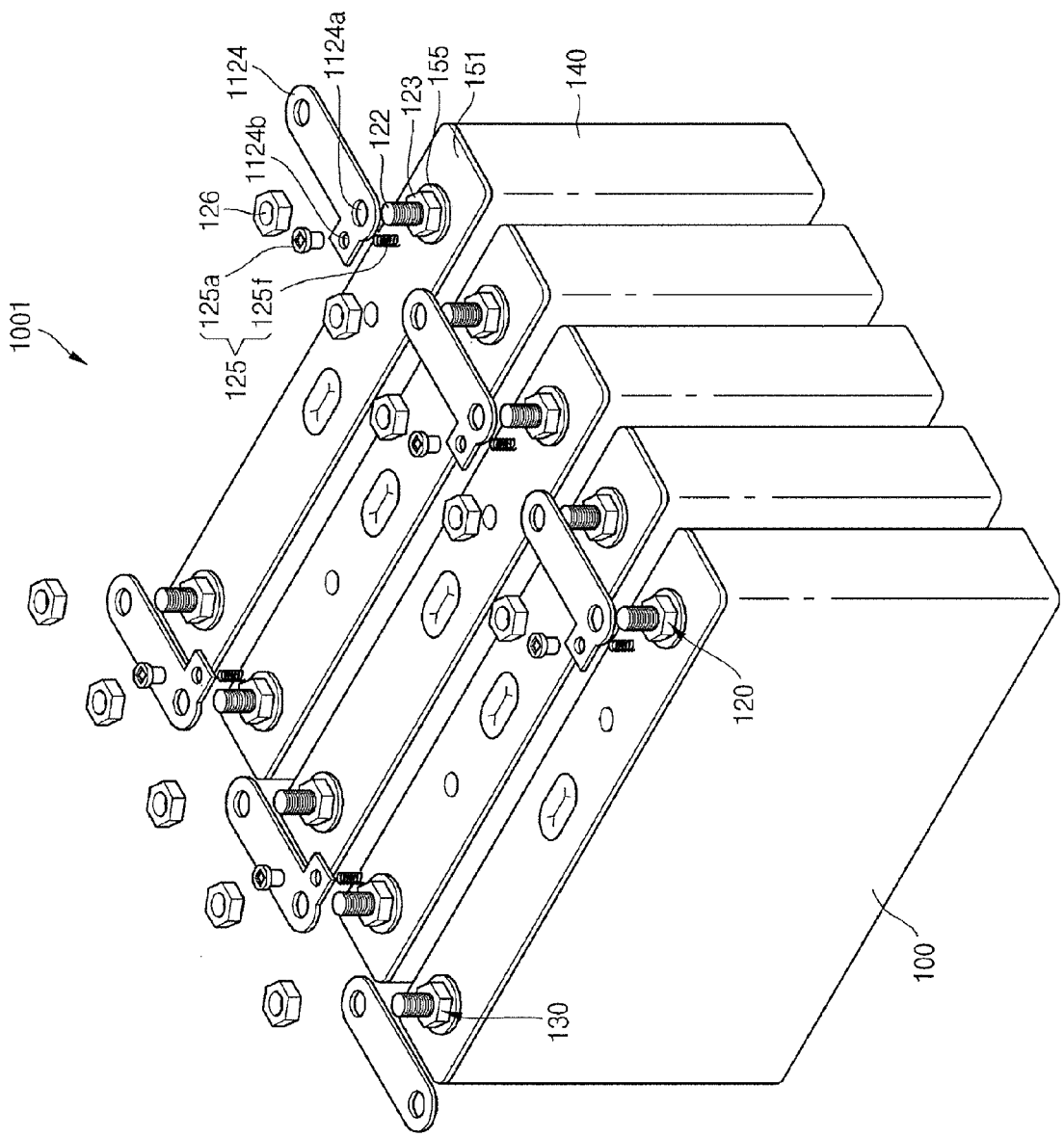
FIG. 6 is an exploded perspective view illustrating a battery pack according to another embodiment.

FIG. 6 is an exploded perspective view illustrating a battery pack 1001 according to another embodiment.

Referring to FIG. 6, the battery pack 1001 includes the secondary batteries 100, which include the fuse parts 125, respectively. That is, the fuse part 125 may be disposed between the battery case 140 and the bus bar 1124 coupled to the first electrode terminal 120 of each of the secondary batteries 100. As such, since all the secondary batteries 100 are provided with the fuse parts 125, respectively, if any one of the secondary batteries 100 is in an abnormal state (e.g., penetrated by a nail), the secondary battery 100 is quickly neutralized, thereby further improving safety and reliability of the battery pack 1001.

According to the embodiment of FIG. 6, since the first electrode terminal 120 having the first polarity (positive or negative polarity) is connected to the battery case 140 through the fuse part 125, the battery case 140 has the first polarity in a normal operation. For example, it may be assumed that the electric potential of the first electrode terminal 120 having the first polarity is higher than that of the second electrode terminal 130 having the second polarity. Thus, the electric potential of the battery case 140 is higher than that of the second electrode terminal 130 at all times, thereby preventing (or reducing) the corrosion of the battery case 140. That is, the battery case 140 has an electric potential higher than a corrosion potential of about 1V, thereby preventing (or reducing) corrosion of the battery case 140. Since the battery case 140 has a polarity, an external circuit of the secondary battery 100 can be efficiently designed. For example, when the battery case 140 has the positive polarity, a circuit pattern constituting an external circuit and related to the positive polarity can be efficiently designed.

According to the embodiment of FIG. 6, when, for example, a nail passes through the secondary battery 100 or the battery pack 1001, or when the battery pack 1001 or the secondary battery 100 is over discharged or over charged, an over current flows through the fuse 125 and melts it. Thus, the first electrode terminal 120 having the first polarity is electrically disconnected from the battery case 140. That is, the battery case 140 is quickly neutralized in an abnormal operation. Accordingly, safety and reliability of the secondary battery 100 and the battery pack 1001 are further improved.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims, and equivalents thereof.

What is claimed is:

1. A secondary battery comprising:
an electrode assembly;
an electrically conductive battery case accommodating the electrode assembly;
an electrode terminal electrically connected to the electrode assembly and extending out of the battery case;
a fuse part electrically connecting the battery case to the electrode assembly through the electrode terminal when not in a blown state and electrically disconnecting the battery case from the electrode assembly when transitioning to the blown state; and
a connecting bar electrically connecting the fuse part to the electrode terminal,
wherein the fuse part comprises:
a fuse holder coupling to the connecting bar; and
a fuse device coupling to the fuse holder and electrically connecting the battery case to the connecting bar when not in the blown state and electrically disconnecting the battery case from the connecting bar when transitioning to the blown state, and
wherein the fuse device is formed of one of a copper alloy or an alloy of zinc and tin.

2. The secondary battery as claimed in claim 1, wherein
the battery case comprises an electrically conductive cap plate covering the electrode assembly
and electrically connected to the electrode assembly through the electrode terminal when the fuse part is not in the blown state, and
the electrode terminal passes through the cap plate and extends out of the cap plate.

3. The secondary battery as claimed in claim 2, further comprising:
an insulation member on the cap plate where the electrode terminal passes through;
a first coupling member mechanically coupling the electrode terminal to the cap plate with the insulation member therebetween, the connecting bar being on the first coupling member; and
a second coupling member mechanically coupling the connecting bar to the electrode terminal.

4. The secondary battery as claimed in claim 1, wherein
the electrode terminal comprises a positive electrode terminal and a negative electrode terminal, and
the fuse part electrically connects the battery case to the electrode assembly through the positive electrode terminal when not in the blown state.

5. The secondary battery as claimed in claim 1, wherein the fuse holder comprises:
a first region on a surface of the connecting bar; and
a second region passing through the connecting bar and extending from the first region in a direction toward the battery case and having an accommodation recess accommodating the fuse device.

6. The secondary battery as claimed in claim 1, wherein the fuse device comprises a spring.

7. The secondary battery as claimed in claim 1, wherein the connecting bar has:
a first through hole coupling with the electrode terminal; and
a second through hole coupling with the fuse part.

8. The secondary battery as claimed in claim 1, wherein the connecting bar is formed of one of aluminum or aluminum alloy.

9. A battery pack comprising:
secondary batteries, each comprising an electrically condutive battery case and an electrode terminal extending out of the battery case, the electrode terminal being electrically connected to an electrode assembly within the battery case;
bus bars electrically connecting the secondary batteries in series or in parallel, each of the bus bars electrically connecting the electrode terminal of one of the secondary batteries to one or more others of the secondary batteries; and
a fuse part electrically connecting the battery case of a secondary battery of the secondary batteries to the electrode assembly of the secondary battery through one of the bus bars when not in a blown state and electrically disconnecting the battery case of the secondary battery from the electrode assembly of the secondary battery when transitioning to the blown state,
wherein the fuse part comprises:

a fuse holder coupling to the one of the bus bars; and a fuse device coupling to the fuse holder and electrically connecting the battery case of the secondary battery to the one of the bus bars when not in the blown state and electrically disconnecting the battery case of the secondary battery from the one of the bus bars when transitioning to the blown state, and wherein the fuse device is formed of one of a copper alloy or an alloy of zinc and tin.

10. The battery pack as claimed in claim 9, wherein the secondary battery is an outermost one of the secondary batteries.

11. The battery pack as claimed in claim 10, wherein the outermost one of the secondary batteries comprises two outermost ones of the secondary batteries, and the fuse part comprises a fuse part for each of both of the outermost ones of the secondary batteries.

12. The battery pack as claimed in claim 9, wherein the fuse part comprises a fuse part for each of the secondary batteries.

13. The battery pack as claimed in claim 9, wherein the fuse holder comprises:

a first region on a surface of the one of the bus bars; and a second region passing through the one of the bus bars and extending from the first region in a direction toward the battery case of the secondary battery and having an accommodation recess to accommodate the fuse device.

14. The battery pack as claimed in claim 9, wherein the fuse device comprises a spring.

15. The battery pack as claimed in claim 9, wherein the one of the bus bars has:

a first through hole coupling with the electrode terminal of the one of the secondary battery; and a second through hole coupling with the fuse part.

16. The battery pack as claimed in claim 9, wherein the electrode terminal of the secondary battery comprises a positive electrode terminal and a negative electrode terminal, and the one of the bus bars is electrically connected to the positive electrode terminal.

* * * * *